United States Patent Office 3,634,326
Patented Jan. 11, 1972

3,634,326
METHOD OF MANUFACTURE OF RESINOUS PRODUCTS FROM EPOXY COMPOUNDS
Jean Aubry and Francois Lenclud, Forbach, France, assignors to Societe Chimique des Charbonnages, Seine, France
No Drawing. Filed June 30, 1969, Ser. No. 837,875
Claims priority, application France, July 2, 1968, 157,599
Int. Cl. C08g 30/12
U.S. Cl. 260—47                                    4 Claims

ABSTRACT OF THE DISCLOSURE

A method of preparation of hardenable resinous compositions based on polyepoxy resin and slightly soluble anhydrides of carboxylic acids. The method comprises reacting an epoxy resin and an anhydride or dianhydride of cyclopentane-tetracarboxylic acid, or dianhydride of benzophenone-tertacarboxylic acid in the presence of a strongly polar solvent like acetonitrile, heating the reaction mass, removing the solvent and further diluting with a ketone solvent. The compositions are applicable as hardenable binding agent namely fibrous materials.

---

The present invention relates to hardenable resinous compositions with a base of poly-epoxy resin and slightly soluble anhydrides of carboxylic acids.

Resinous compositions containing poly-epoxides and mono- or di-anhydrides of poly-carboxylic acids are already known. Thus, French Patent No. 1,260,405 describes the reaction products of a poly-epoxy on the di-anhydride of 1,2,3,4-cyclopentane-tetracarboxylic acid.

The U.S. Patent No. 3,275,599 describes the hardening of a poly-epoxy resin by a mono-anhydride with a low melting point of 1,2,3,4-cyclopentane-tetracarboxylic acid.

In the methods known to the prior art, the resin and the anhydride were put into contact, either in the solid state or in the presence of a ketone solvent such as methyl-ethyl-ketone or methyl-isobutyl-ketone. In addition, the products at present known and resulting from the same reaction are brought to their final state in a single stage, and the means utilized do not permit the reaction to be controlled during the course of its development, so as to act on the final degree of hardness, insolubility, and even of reactivity.

The present invention provides a means for carrying out a controlled reaction between the di-anhydride and the epoxy resin, in such manner as to be able to limit at will the degree of development of the reaction and thus obtain homogeneous compositions still having a certain reactivity, and which are totally soluble in the usual solvents of the epoxy resins, this being obtained even in the case where the anhydride reactant is very difficult to dissolve in the initial epoxy resin.

These homogeneous solid or liquid compositions are still reactive by reason of the presence of anhydrides or acid functions and free epoxides or alcohols, depending on the proportions employed initially. These compositions are sufficiently stable to be kept for a reasonable time before use. They can then be employed either as they are or in solution in an appropriate solvent for the known uses of poly-epoxy resins (moulding resins, manufacture of stratified products) or they may be caused to react by any appropriate means with other reactive compounds or compositions such as phenol resins, polyesters or alkyds, urea-formol, melamine-formol, silicone resins, etc.

The present invention is also applicable to the reactions of epoxy resins with slightly soluble polyfunctional reactants such as certain mono-anhydrides of polycarboxylic acids.

The objects of the invention are achieved by putting the epoxy resin and the anhydride reactant into contact in appropriate proportions, in the presence of a strongly polar solvent, with heating up to complete solution; the reaction is stopped at the desired moment by stopping the heating and, if necessary, the solvent is subsequently evaporated.

In accordance with other characteristic features of the invention:

The anhydride reactant is advantageously selected from the following: mono- and di-anhydrides of cyclopentane-tetracarboxylic acids (CPMA and CPDA), di-anhydride of benzophenone-tetracarboxylic acid.

The epoxy resin employed is of any known type of epoxy resin. Epoxy resins are compounds that contain at least one epoxide group and preferably those which contain two or more epoxide groupings.

The solvent will be selected from the strongly polar solvents, such as dimethyl-sulphoxide, dimethyl-formamide, acetonitrile, acrylonitrile, etc., acetonitrile being the preferred solvent.

The proportion of anhydride reactant may reach a maximum of 0.5 mol per epoxy group; it is preferably selected between 0.1 and 0.3 mol.

The proportion of the solvent is comprised between 10 and 150 parts of solvent to 100 parts of epoxy resin.

The mono-anhydrides of polycarboxylic acids are prepared by partial hydrolysis of the corresponding dianhydride, these being obtained by means of the method described by K. Alders, H. H. Molls and R. Reeber in Annal. Chemie, 1958, vol. 611, pages 7 to 32.

By carrying out the operation according to the invention, it is thus possible to employ a large proportion of anhydride reactant.

It is for example possible to combine up to 45 parts of dianhydride (CPDA) with 100 parts of epoxy resin of epoxy equivalent 190. In this case, by stopping the reaction at the favorable moment, there is obtained a combination which is soluble in the usual solvents, especially ketones, and is subsequently hardenable to a homogeneous tough and transparent resinous mass which it would not be possible to obtain by working without solvent, by simple dispersion of the dianhydride in the epoxy resin, nor in a ketone solvent.

This hardened resinous mass has a high temperature of distortion, in fact higher than 250° C. after curing for 24 hours at 200° C. (the distortion temperature is measured in accordance wtih the AFNOR Standard T 51–005 with a load of 18.5 kg./sq.cm.).

To carry the invention into effect, the operations are as follows:

The epoxy resin, the anhydride reactant and the polar solvent are reacted in a tank provided with a heating device, a stirring device and a condenser.

The mixture is heated to a suitable temperature while stirring, until all the anhydride reactant has passed into reaction, which can be seen from the absence of suspension in the reaction medium.

The polar solvent is then evaporated under vacuum, and after it has been completely removed, it is replaced by a ketone or ester solvent or any other solvent according to the conditions of use of the resinous solution prepared in accordance with the invention.

It is then found that the anhydride reactant has entered totally in combination, giving a clear solution.

This solution can be employed for the preparation of protective varnishes or for coating fibrous supports such

EXAMPLE 1

In a reactor provided with a heating device, an agitator and a condenser, the following reactants are heated:

| | Grams |
|---|---|
| Liquid epoxy resin, epoxy index 190 | 1,000 |
| Dianhydride of cyclopentane-tetracarboxylic acid | 350 |
| Acetonitrile | 400 |

By boiling, the temperature becomes fixed at 90° C. After 4½ hours, the dianhydride is rendered soluble and is combined in soluble form with the resin. The actonitrile is evaporated under vacuum at low temperature. After complete removal of the solvent, the resinous mass is diluted with acetone. There is obtained a clear and homogeneous solution which does not allow the dianhydride to deposit, even after a prolonged rest.

After evaporation of the acetone, hardening at 140° C. for 6 hours and then at 200° C. for 24 hours, the temperature of distortion of the resin is higher than 250° C. This resin is obtained in the form of a tough, straw-yellow transparent material.

EXAMPLE 2

The reaction is carried out with:

| | Grams |
|---|---|
| Liquid epoxy resin as in Example 1 | 1,000 |
| Dianhydride of cyclopentane-tetracarboxylic acid | 400 |
| Dimethyl-formamide | 500 |

The mixture is heated to 90° C. for 4 hours. The dianhydride is then rendered completely soluble. The dimethylformamide is evaporated under vacuum and the clear resin formed is diluted by methyl-ethyl-ketone.

After evaporation and curing for 24 hours at 200° C., the resin obtained is clear, tough and transparent, with a distortion temperature higher than 250° C.

EXAMPLE 3

The reaction is carried out with:

| | Grams |
|---|---|
| The epoxy resin of Example 1 | 1,000 |
| Dianhydride of cyclopentane - tetracarboxylic acid | 350 |
| Acrylonitrile | 500 |

Heating is carried out to reflux for 5 hours at 85° C. The dianhydride is then completely combined. The acrylonitrile is evaporated and the resin formed is diluted with acetone.

EXAMPLE 4

The reaction is carried out with:

| | Grams |
|---|---|
| The epoxy resin of Example 1 | 1,000 |
| Dianhydride of cyclopentane-tetracarboxylic acid | 450 |
| Acetonitrile | 500 |

The mixture is heated to reflux for 5 hours at 90° C. The dianhydride has wholly passed into reaction. The acetonitrile is evaporated under vacuum and the clear resin formed is dissolved in methyl-ethyl-ketone.

After evaporation of the solvent and curing for 24 hours at 200° C., the resin obtained is tough and transparent, with a distortion temperature higher than 250° C.

EXAMPLE 5

Preparation of a stratified product with the resin obtained in Example 1

The prepared resin is diluted with acetone up to a concentration of 50% of dry materials in the solution.

A glass fabric weighing 420 grams per sq.m. is then coated by soaking in the resin solution. Between 30 and 35% of the resin remains on the coated fabric. This is dried for 20 minutes at 120° C. in order to remove the solvent. 6 sheets of this coated fabric are then pressed in a heated hydraulic press for 1½ hours at 160° C. under 75 kg./sq.cm.

A stratified product of 2 mm. in thickness is obtained. After further curing for 24 hours at 200° C., its mechanical properties vary only slightly between 20° C. and 160° C.; in particular, its resistance to bending is 32 kg./sq.mm. at 20° C., 27 kg./sq.mm. at 160° C.

Example 5 furthermore confirms the advantage of the use of the dianhydride of tetracarboxylic acids instead of the anhydride of dicarboxylic acids. Comparative tests in the preparation of stratified products carried out under the same conditions with monoanhydrides of dicarboxylic acids resulted in products having a resistance to bending which was almost zero at 160° C., the distortion temperature being 110° C. (This temperature exceeds 250° C. with the dianhydride.)

EXAMPLE 6

This example illustrates what occurs when the operation is carried out by a method differing from that of the invention, that is to say without the use of a strongly polar solvent.

In an apparatus provided with a heating device, an agitator and a thermometer:

| | Grams |
|---|---|
| The epoxy resin of Example 1 | 1,000 |
| Dianhydride of 1,2,3,4-cyclopentane-tetracarboxylic acid in powder form | 290 | are heated for 15 minutes at 165° C. After this time, the resin has already become considerably thicker and there remains dispersed dianhydride which has not passed into combination.

The product is poured into a mould and heated for 24 hours at 200° C. The resin has become hard, but remains opaque as a result of a high proportion of dianhydride which has not reacted. There is observed in the lower parts of the mould a decantation of the non-combined dianhydride.

If, instead of hardening the resin after 15 minutes reaction at 165° C., it had been attempted to dissolve the product in acetone, it would have been found that the epoxy resin combined with part of the dianhydride is dissolved, but that there remains a large quantity of uncombined dianhydride which subsequently decants from the solution. The distortion temperature of the resin obtained by this method, after curing for 24 hours at 200° C. is only 110° C.

EXAMPLE 7

In a reactor provided with a heating device, an agitator and a condenser, the following reactants are heated:

| | Grams |
|---|---|
| Liquid epoxy resin with an epoxide index of 190 | 1,000 |
| Dianhydride of cyclopentane-tetracarboxylic acid | 350 |
| Methyl-ethyl-ketone | 500 |

The mixture is heated to boiling point for 16 hours, after which about half the dianhydride remains unchanged and undissolved. After evaporation of the solvent and curing for 24 hours at 200° C., the resin obtained has become hard.

EXAMPLE 8

The following reactants are heated to reflux:

| | Grams |
|---|---|
| The epoxy resin of Example 1 | 1,000 |
| Dianhydride of benzophenone-tetracarboxylic acid | 535 |
| Acetonitrile | 1,200 | for 7 hours at 84° C. The dianhydride has then been rendered completely soluble. The acetonitrile is then eliminated by distillation under vacuum at low temperature. The resinous mass can then be diluted with methyl-ethyl-ketone. There is no observable deposit of benzophenone-tetracarboxyl-dianhydride, this latter having been completely combined with the epoxy resin in a form which is soluble in the ketone solvents.

After evaporation of the ketone solvent and curing for 24 hours at 180° C., there is obtained a tough, homogeneous, transparent and infusible resinous mass of straw colour. Its distortion temperature is higher than 240° C.

It is furthermore obvious that the present invention has only been described purely by way of explanation and not in any limitative sense, and that any useful modification may be made thereto without thereby departing from its scope. In particular, the invention should not be limited to the resins given in the above examples, it being understood that the method of the invention may be applied to all poly-epoxy resins other than those used in the above examples which are prepared solely from bis-phenol A and epichloro-hydrin.

We claim:
1. A method of preparation of hardenable resinous compositions, comprising:
  partially reacting, an epoxy resin and a compound selected from the group consisting of mono-anhydride (all cis) and stereo-isomers of the dianhydride of cyclopentane-tetracarboxylic acid and the dianhydride of benzophenone-tetracarboxylic acid in the presence of a solvent selected from the group consisting of acetonitrile, dimethyl-formamide and acrylonitrile;
  heating with agitation to a temperature of about 84° C. to about 90° C. until a clear solution is obtained; removing said solvent; and
  diluting the reaction mass by adding a ketone solvent or ester.

2. A method in accordance with claim 1, wherein said anhydride is present in a quantity of 0.1–0.5 mole per epoxy groups.

3. A method in accordance with claim 2 wherein said anhydride reactant is present in the amount of between 0.1–0.3 mole per epoxy groups.

4. A method in accordance with claim 1, wherein said solvent selected from the group consisting of acetonitrile, dimethyl-formamide and acrylonitrile is present in an amount between 10 and 150 parts per 100 parts of epoxy resin.

References Cited

UNITED STATES PATENTS

| | | | |
|---|---|---|---|
| 461,523 | 10/1891 | Phelps | 85—53 X |
| 2,077,784 | 4/1937 | Tripp | 85—28 X |
| 2,431,853 | 12/1947 | Wischhusen et al. | 85—1 C UX |
| 3,399,589 | 9/1968 | Breed | 85—1 |
| 3,494,243 | 2/1970 | Kleinhenn | 85—1 |
| 2,996,693 | 8/1961 | Feuchtbaum | 260—837 X |
| 3,102,872 | 9/1963 | Carlson et al. | 260—47 |
| 3,275,599 | 9/1966 | Petropoulos et al. | 260—47 |
| 3,344,096 | 9/1967 | Manasia et al. | 260—18 |
| 3,362,922 | 1/1968 | Manasia et al. | 260—18 |
| 3,388,185 | 6/1968 | Goldberg et al. | 260—830 |
| 3,429,981 | 2/1969 | Shallahamer et al. | 174—52 |
| 3,438,849 | 4/1969 | Isack | 260—78.4 X |
| 3,468,824 | 9/1969 | Williams | 260—18 |
| 3,269,974 | 8/1966 | Childs | 260—37 |

FOREIGN PATENTS

| | | | |
|---|---|---|---|
| 1,296,555 | 5/1962 | France | 85—1 J.P. |

OTHER REFERENCES

"Handbook of Epoxy Resins," Lee and Neville, McGraw-Hill 1967, pp. 12–14 (Chapter 12, p. 14).

WILLIAM H. SHORT, Primary Examiner

E. A. NIELSEN, Assistant Examiner

U.S. Cl. X.R.

260—2 EA, 32.8 EP, 47 EA, 75 EP, 78.4 EP